(12) United States Patent
Zimmermann (10) Patent No.: US 6,587,552 B1
(45) Date of Patent: Jul. 1, 2003

(54) FRAUD LIBRARY

(75) Inventor: Ron Zimmermann, Lakewood, CO (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/784,457

(22) Filed: Feb. 15, 2001

(51) Int. Cl.[7] ............................................. H04M 15/00
(52) U.S. Cl. ........................... 379/114.14; 379/127.02; 379/115.03
(58) Field of Search ................ 379/114.04, 114.14, 379/111, 112.01, 112.03, 112.05, 112.06, 144.03, 115.01, 115.02, 115.03, 121.01, 122, 126, 127.02, 127.01, 145, 188; 455/410

(56) References Cited

U.S. PATENT DOCUMENTS

| | | | |
|---|---|---|---|
| 5,345,595 A | * 9/1994 | Johnson et al. | 379/115 |
| 5,550,903 A | * 8/1996 | Chang | 379/115 |
| 6,075,848 A | * 6/2000 | Lunn et al. | 379/113 |

\* cited by examiner

Primary Examiner—Rexford Barnie (57) ABSTRACT

A system for analyzing fraud in a telecommunications system, where the system comprises at least one processor, software and calling records stored in a database. The at least one processor has input that receives a user selection of a revenue source and one or more streams of revenue that contribute to the revenue source. The system retrieves and processes the calling records pertaining to the selected revenue source or stream of revenue. The system then generates at least one graphical display pertaining to the revenue generated and losses due to fraud for the selected revenue source or stream of revenue. A method for analyzing fraud in a telecommunications system presents a user with graphic data pertaining to fraud and revenue for a revenue source. The user is then presented with a selection of one or more streams of revenue of an nth level that contribute to the revenue source, where n is greater than or equal to one. The user provides a selection for one of the one or more nth level streams of revenue. Graphic data is then generated pertaining to fraud and revenue for the selected nth level stream of revenue. Each first (n=1) level stream of revenue contributes a distinctly defined portion of revenue to the revenue source and each nth level stream of revenue where n≧2 contributes a distinctly defined portion of revenue to an (n−1)th level stream of revenue

20 Claims, 10 Drawing Sheets

MCI CARD, U.S. → FOREIGN ANIs

| Country Code | Originating ANI | Terminating ANI | Billing Number | Cost | Date | Fraud Bit |
|---|---|---|---|---|---|---|
| ... | ... | ... | ... | ... | ... | ... |
| 82 | 516-555-1313 | 46-911-2347 | 1234-1234-1234-1234 | 25 | 031300 | 0 |
| 82 | 203-444-2121 | 20-489-1234 | 2341-2341-2341-2341 | 8 | 031300 | 0 |
| 82 | 917-456-7890 | 21-289-1190 | 0010-4691-2413-0630 | 170 | 031400 | 1 |
| 82 | 121-333-1234 | 20-267-5380 | 2349-2349-2359-2369 | 12 | 031400 | 0 |
| ... | ... | ... | ... | ... | ... | ... |
| 87 | 518-567-3290 | 20-489-2345 | 1234-2345-3456-4567 | 17 | 031200 | 0 |
| 87 | 617-322-0900 | 46-917-2867 | 5678-6789-7890-8901 | 14 | 031200 | 0 |
| ... | ... | ... | ... | ... | ... | ... |

FIG. 1

MCI CARD, FOREIGN ANIs → U.S.

| Country Code | Originating ANI | Terminating ANI | Billing Number | Cost | Date | Fraud Bit |
|---|---|---|---|---|---|---|
| ... | ... | ... | ... | ... | ... | ... |
| 58 | 08-432-7771 | 516-817-7198 | 7128 7128 7128 7128 | 27 | 031400 | 0 |
| 58 | 06-999-4432 | 207-432-7910 | 3456 3456 3456 3456 | 14 | 031400 | 0 |
| 58 | 12-123-4567 | 917-666-2030 | 0123 1230 2301 3012 | 1980 | 031500 | 1 |
| ... | ... | ... | ... | ... | ... | ... |
| 61 | 19-22-3091 | 303-488-7123 | 4723 4723 4723 4723 | 180 | 031800 | 0 |
| 62 | 26-89-4227 | 203-289-1190 | 4091 4009 1763 2002 | 28 | 031200 | 0 |
| 62 | 20-20-3001 | 201-205-1919 | 7763 7769 7702 2010 | 58 | 031200 | 0 |
| ... | ... | ... | ... | ... | ... | ... |

FIG. 1A

MCI CARD, FOREIGN ANI → FOREIGN ANI (EXCLUDES U.S.)

| Originating Country Code | Terminating Country Code | Originating ANI | Terminating ANI | Billing Number | Cost | Date | Fraud Bit |
|---|---|---|---|---|---|---|---|
| 2 | 3 | 56-209-7301 | 21-324-7128 | 0135 1350 3501 5013 | 35 | 031300 | 0 |
| 2 | 3 | 52-732-3690 | 27-422-0801 | 0223 4793 3301 5710 | 28 | 031500 | 1 |
| 2 | 12 | 59-265-3275 | 47-907-4700 | 9936 3699 4501 2109 | 75 | 031400 | 0 |
| 2 | 12 | 52-889-3047 | 36-932-4827 | 2142 0897 6612 4703 | 22 | 031700 | 0 |
| ... | ... | | | | | | |
| 3 | 2 | 21-301-4936 | 52-369-2102 | 7779 3206 4201 9979 | 18 | 031300 | 0 |
| 3 | 4 | 21-499-3670 | 66-097-4321 | 6369 3270 4498 9807 | 7 | 031300 | 0 |
| 3 | 12 | 21-309-4632 | 36-399-4476 | 6107 6701 1008 3910 | 21 | 031500 | 0 |
| ... | ... | | | | | | |
| 23 | 2 | 82-397-4301 | 52-476-9128 | 5234 2354 5432 3245 | 103 | 031300 | 0 |
| 23 | 2 | 87-793-4210 | 29-362-1190 | 2079 7902 2232 3766 | 80 | 031600 | 0 |
| 23 | 60 | 82-210-9732 | 40-807-7080 | 2962 3002 4932 4523 | 22 | 031500 | 0 |

MCI CARD, FOREIGN ANI → FOREIGN ANI (INCLUDES U.S.)

| Originating Country Code | Terminating Country Code | Originating ANI | Terminating ANI | Billing Number | Cost | Date | Fraud Bit |
|---|---|---|---|---|---|---|---|
| 01 | 02 | 516-209-7301 | 21-324-7128 | 0135 1350 3501 5013 | 27 | 031300 | 0 |
| 01 | 02 | 617-732-3690 | 27-422-0801 | 0223 4793 3301 5710 | 18 | 031300 | 0 |
| 01 | 02 | 312-265-3275 | 21-907-4721 | 9936 3699 7779 2109 | 85 | 031300 | 0 |
| ... | ... | ... | ... | ... | ... | ... | ... |
| 82 | 01 | 22-508-0973 | 516-289-3275 | 2962 6107 4201 3206 | 70 | 031300 | 0 |
| 82 | 01 | 22-588-2249 | 203-444-3142 | 5234 0897 3301 8787 | 20 | 031300 | 0 |
| 82 | 27 | 22-267-5380 | 617-489-3679 | 5010 0327 4429 1190 | 21 | 031800 | 0 |
| 82 | 28 | 22-410-1010 | 914-322-2210 | 5736 9936 0153 1350 | 18 | 031300 | 0 |

FIG. 7

MCI CARD, FOREIGN ANI → FOREIGN ANI (INCLUDES U.S.)

| Originating Country Code | Terminating Country Code | Originating ANI | Terminating ANI | Platform | Billing Product | Cost | Date | Fraud Bit |
|---|---|---|---|---|---|---|---|---|
| 01 | 02 | 516-209-7301 | 21-324-7128 | ISN | MCI Card | 27 | 031300 | 0 |
| 01 | 02 | 617-732-3690 | 27-422-0801 | ISN | Visa | 18 | 031300 | 0 |
| 01 | 02 | 312-265-3275 | 21-907-4721 | Dial-1 | N/A | 85 | 031300 | 0 |
| ... | ... | ... | ... | ... | ... | ... | ... | ... |
| 82 | 01 | 22-508-0973 | 516-289-3275 | ISN | MCI Card | 70 | 031300 | 0 |
| 82 | 01 | 22-588-2249 | 203-444-3142 | ISN | AMEX | 20 | 031300 | 0 |
| 82 | 27 | 22-267-5380 | 617-489-3679 | ISN | MCI Card | 21 | 031800 | 0 |
| 82 | 28 | 22-410-1010 | 914-322-2210 | ISN | MCI Card | 18 | 031300 | 0 |

FIG. 8

FRAUD LIBRARY

BACKGROUND OF THE INVENTION

1. Field of the Invention

The invention relates to preventing fraudulent access to a telecommunications system. The invention relates to analyzing fraudulent calling patterns and using such analysis to implement steps to prevent such fraud.

2. Description of the Related Art

Fraud costs the telecommunications industry billions of dollars per year. There are many techniques used to perpetrate fraud. The fraud can be as simple as using a stolen credit card to charge a long distance call, or it can involve sophisticated looping techniques, such as repeatedly calling a private PBX system, finding the correct sequence to access an outside line (by trial and error or other hacking techniques) and then placing a costly long distance call through the PBX system. The telecommunications industry is involved in an intensive and ongoing effort to identify different types of fraud and then to develop and implement ways of preventing such fraud.

Fraud is more costly to certain telecommunications companies than others. For example, where a fraudulent call is directed at a company that owns the underlying telecommunications infrastructure, the cost of the call is less than the cost to an independent company that incurs access charges to the owner(s) of the infrastructure supporting the call, even if the call is fraudulent. In either case, however, the cost to the industry is significant.

Particular methods of fraud control and systems for implementing them are known in the industry. Fraud control may be divided conceptually into identifying a call that is likely to be fraudulent and responding after a call is identified as likely to be fraudulent.

Methods of identifying calls that are likely to be fraudulent vary from the simple to the sophisticated and are generally directed at a particular type of fraudulent activity. For example, a call is likely to be fraudulent if it is made using a calling card that has been reported stolen by the owner. A more sophisticated method of identifying fraudulent calls is described in U.S. Pat. No. 5,768,354, entitled "Fraud Evaluation and Reporting System and Method Thereof", which is owned by the assignee of the present invention ("the '354 patent"). Fraudulent activity is identified in the '354 patent by monitoring the activity of a billing number, such as a calling card number or a credit card number. If certain patterns of calling are detected, an alert is generated. The alert can be analyzed and a decision may be made to block subsequent calls made using the billing number. U.S. Pat. No. 5,768,354 is hereby incorporated by reference.

Once a fraud alert is generated, various responses may be taken. One typical reaction is to transfer the underlying calling data that generates the alert to a fraud analyst. The fraud analyst may determine what response is appropriate based on a review of the calling data received alone, or may decide to access additional information to determine the appropriate response. The fraud analyst's response will depend on what generated the alert.

For example, if an alert has been generated for a certain calling card (billing number) because it is used for more than a threshold number of calls within a certain period of time, then the data for the calls is transferred to the fraud analyst. This would include the originating and terminating telephone numbers (also known as originating automatic number indicators (or originating ANIs) and terminating automatic number indicators (or terminating ANIs)) and an indicia of time of the calls. The analyst may make a determination based on this underlying data that the calls are fraudulent and that further special services calls that use that billing number should be blocked.

As noted, the telecommunications industry is involved in an intensive and ongoing effort to identify different types of fraud and then to develop and implement ways of preventing such fraud. Thus, the above described system and method for generating a fraud alert based on use of a billing number and then blocking the billing number is one way among many that fraud may be detected and prevented by a particular telecommunications company and the industry at large.

A difficulty arises in that there is a finite amount of resources that any company may devote to fraud detection and prevention. It is therefore desirable to identify trends and financial impact of frauds, so that resources can be applied where they are needed. Since techniques of fraud are always changing, it is also desirable to have a way to rapidly evaluate such trends and impacts.

Calling records of a company are available to be reviewed and compared with prior weeks, (or other intervals) in order to try to detect increases in fraudulent activity. This, however, requires that the evaluator be able to perceive trends from the raw data itself, often an impossible task.

For example, in the course of one month, fraudulent calls using calling cards from the U.S. to China may decrease by 10%. This may be attributable to the focusing of resources on preventing such fraudulent calls from the U.S. to China. However, as a result, there may be an increase in fraudulent calls within the U.S. to private PBX systems, and then from the fraudulently accessed PBX systems to China directly (that is, without using a calling card). Trying to detect such a trend by relying on raw calling records, however, is like looking for a needle in a haystack. Even if international calls from the United States to China were culled out of the raw data and the evaluator could somehow discern an increase in fraudulent calling to China using direct dialing (i.e., placing "dial 1" calls using the fraudulently accessed PBX systems), such an evaluation process is ad hoc and time consuming. In addition, if the fraudulent calls were made to PBX systems in a host of different countries, which were then used as platforms to call China, for example, the trend of calling through a PBX may riot be detected at all.

SUMMARY OF THE INVENTION

Since there is a finite level of resources that a telecommunications company can devote to fraud detection and prevention, it is desirable that it be apportioned in the most efficient way possible. In particular, it is desirable that the money saved by fraud detection and prevention efforts be maximized in relation to the amount of resources devoted to the effort.

Thus, it is an objective of the invention to provide a system and technique for organizing raw calling data into a format that can be presented to an evaluator in a manner that can be used by the evaluator to detect increases, decreases, reapportioning and other trends in fraudulent activity. It is also an objective to provide a system and technique that allows the evaluator to further refine the selection of raw calling data used in the display and presentation in order to hone in on a trend in fraudulent calling activity. Finally, it is an objective to provide a system and technique that uses the identification of trends in fraudulent activity to enable fraud detection and prevention resources to be applied where they are needed and in a manner that will maximize the reduction in fraud costs to the company.

In accordance with these objectives, the invention provides a system for evaluating losses incurred by fraud. The system is comprised of at least one processor or computer, as well as memory and supporting software. The system receives and stores calling data that relate to various revenue sources over a prior period of time, thus allowing data pertaining to the revenue sources to be generated and displayed by the system. The calling data for each revenue source may be further organized such that streams of revenue of successive levels of detail for the revenue source may be generated and displayed by the system. The calling records include data fields that permit calculation and display of revenue generated and losses incurred by fraud for different sources and levels of revenue streams for the period of time.

The system allows the fraud loss data for a particular revenue source and/or a particular level of revenue stream to be displayed together with the revenue generated for the revenue source or stream over the prior period of time. It also allows other displays to be generated, such as the percentage of fraud loss for the revenue source or the level of revenue stream.

The display allows the user to select between revenue sources and, once a revenue source is selected, to choose and display streams of revenue of successive levels for the revenue source. This allows the user to track a fraud trend that may be perceived to a more definite and focused source.

Thus, the invention generally comprises a system for analyzing fraud in a telecommunications system, where the system comprises at least one processor, software and calling records stored in a database. The at least one processor has input that receives a user selection of a revenue source and one or more streams of revenue that contribute to the revenue source. The system retrieves and processes the calling records pertaining to the selected revenue source or stream of revenue. The system then generates at least one graphical display pertaining to the revenue generated and losses due to fraud for the selected revenue source or stream of revenue.

The invention also includes a method for analyzing fraud in a telecommunications system. A user is presented with graphic data pertaining to fraud and revenue for a revenue source. The user is then presented with a selection of one or more streams of revenue of an nth level for the revenue source, where n is greater than or equal to one. The user provides a selection for one of the one or more streams of revenue of the nth level. Graphic data is then generated pertaining to fraud and revenue for the selected stream of revenue of the nth level.

Thus, the invention generally comprises a method for analyzing fraud in a telecommunications system that presents a user with graphic data pertaining to fraud and revenue for a revenue source. The user is then presented with a selection of one or more streams of revenue of an nth level that contribute to the revenue source, where n is greater than or equal to one. The user provides a selection for one of the one or more nth level streams of revenue. Graphic data is then generated pertaining to fraud and revenue for the selected nth level stream of revenue. Each first (n=1) level stream of revenue contributes a distinctly defined portion of revenue to the revenue source and each nth level stream of revenue where $n \geq 2$ contributes a distinctly defined portion of revenue to an (n−1)th level stream of revenue

DETAILED DESCRIPTION OF THE PREFERRED EMBODIMENTS

Figure 1:
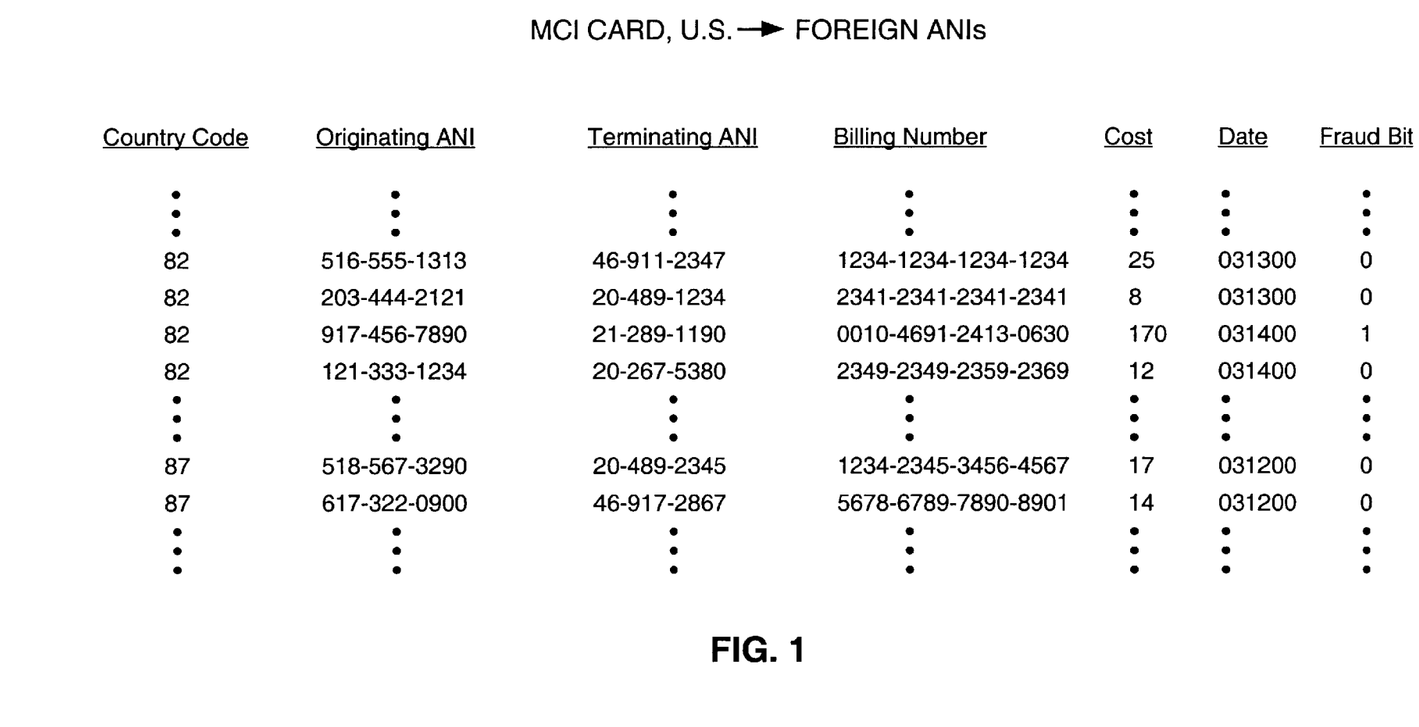
FIG. 1 is an excerpt of a representation of a first set of stored calling records according to the present invention.

The following description focuses on systems and techniques that evaluate fraudulently placed international calls, since international calls account for a large percentage of calling fraud. FIG. 1 is an exemplary display of calling records organized in accordance with a preferred embodiment of the invention. The calling records shown in FIG. 1 are for international calls placed from the United States to foreign countries using a particular billing product, the calling card known as the MCI card. (In general, a billing product is linked to an account that enables a person to place a call through a telecommunications company. Billing products include calling cards, credit cards, pre-paid calling cards, etc.) Revenue generated from the MCI card for all international calling is a revenue source in this exemplary embodiment, whereas revenue generated by calls placed from the U.S. to foreign countries shown in FIG. 1 corresponds to a first level stream of revenue.

FIG. 1 shows representative excerpts of calling records in ascending order by country code of the country to which the call was placed, thus grouping the calling records by country. (A "country code" is assigned to each country and must usually be dialed before placing an international call, thus identifying the country to the telephone system.) The calling records shown in FIG. 1 span a time interval, for example, the week ending Mar. 18, 2000. For each group of calling records having the same country code in FIG. 1 (or, equivalently, for calling records for calls placed from the U.S. to the same foreign country), the calling records are listed in date order.

Thus, an excerpt of calling records for four calls placed from the U.S. to foreign country having country code 82 using the MCI card is shown in FIG. 1. Each calling record includes the originating number (originating automatic number indicator or ANI), the terminating number (or terminating ANI) and the billing number of the MCI card. Each calling record also includes the cost of the call, the date of the call and a "fraud bit". The "fraud bit" is one if the call was fraudulent and is zero if it was a legitimate call.

As seen, the four calls excerpted in FIG. 1 for country code 82 were placed between Mar. 13, 2000 and Mar. 14, 2000. As noted, the data included in FIG. 1 for each country is for the week ending on Mar. 18, 2000. Thus, there are more calling records for country code 82 above and below the excerpt.

Since the calling records are also grouped in ascending order according to country code, there are also groups of calling records for other country codes above and below those for country code 82. For example, also excerpted in FIG. 1 are two calling records for calls to the foreign country with country code 87. These calling records are from the group of calling records for country code 87. The group of calling records for country code 87 are also organized in date order; thus, the two calls excerpted in FIG. 1 for country code 87 were both placed on Mar. 12, 2000.

As noted, for the exemplary embodiment, revenue generated by international calling using the MCI card is deemed a revenue source, whereas revenue generated by calls placed from the U.S. to foreign countries shown in the calling records of FIG. 1 is a first level stream of revenue. Each group of calling records for a foreign country (i.e., having the same country code) in FIG. 1 is thus a second level stream of revenue, since each contributes to the revenue generated by calls placed from the U.S. to foreign countries (the first level stream of revenue). Thus, for example, revenue generated by calls placed from the U.S. to foreign country 82 in FIG. 1 is a second level stream of revenue. Revenue generated by calls placed from the U.S. to foreign country 87 is also a second level stream of revenue. Within each group of calling records for a foreign country, for example, foreign country 82, third level streams of revenue may be identified, such as revenue generated on a particular day, or calls placed from a particular area code in the U.S. to foreign country 82.

Figure 1A:
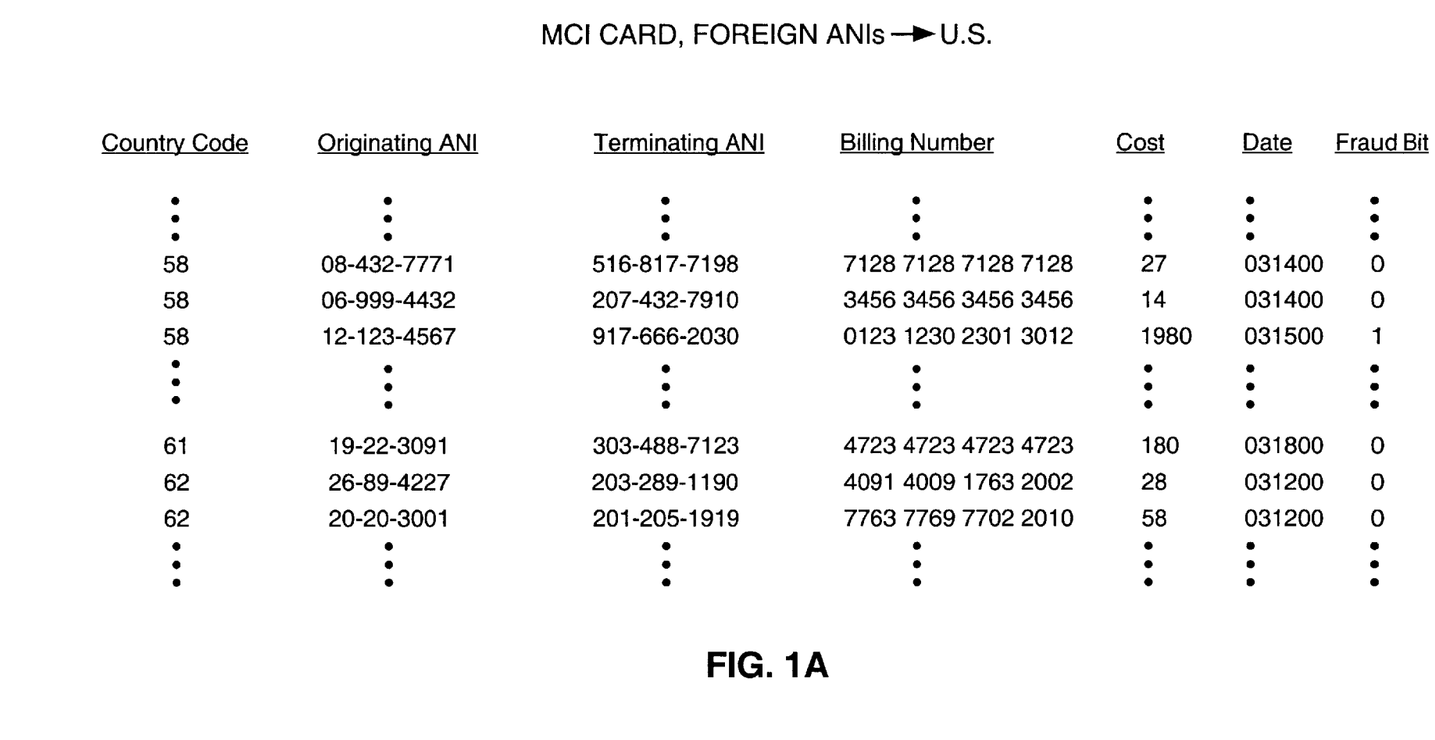
FIG. 1a is an excerpt of a representation of a second set of stored calling records according to the present invention.

Referring to FIG. 1a, another first level stream of revenue is shown for international calling using the MCI card, namely, revenue generated by calls from foreign countries (foreign ANIs) to the United States for the week ending Mar. 18, 2000. The calling data is also arranged in ascending order by country code from where the calls were placed and, within each group of country codes, by date order. Each calling record includes the foreign originating ANI, the U.S. terminating ANI, the MCI card billing number, the cost of the call, the date of the call and the fraud bit.

Thus, for example, FIG. 1a excerpts three calls from foreign country having country code 58 to the U.S. on Mar. 14, 2000 (two calls) and Mar. 15, 2000 (one call). Two of the three calls were legitimately placed (i.e., those having fraud bit "0") and generated revenue for the company. One of the calls having fraud bit "1" generated a fraud loss for the company in the amount of $1980. The lower excerpt of FIG. 1a shows the final call placed from foreign country 61 to the U.S. during the week of March 18 (placed on Mar. 18, 2000) and the first two calls from country 62 to the U.S. during the week of March 18 (placed on Mar. 12, 2000). All three calls shown were legitimate calls and thus generated revenue for the company.

Each group of calling records for a foreign country (i.e., having the same country code) shown in FIG. 1a is a second level stream of revenue, since each contributes to the revenue generated by calls placed from foreign countries to the U.S. (the first level stream of revenue). Thus, for example, revenue generated by calls placed from the foreign country 58 to the U.S. in FIG. 1a is a second level stream of revenue. Revenue generated by calls placed from foreign countries 61 and 62 are each also a second level stream of revenue. Within each group of calling records for a foreign country, for example, foreign country 58, a third level streams of revenue includes the revenue generated for calls directed at a particular area code in the U.S.

Figure 1B:
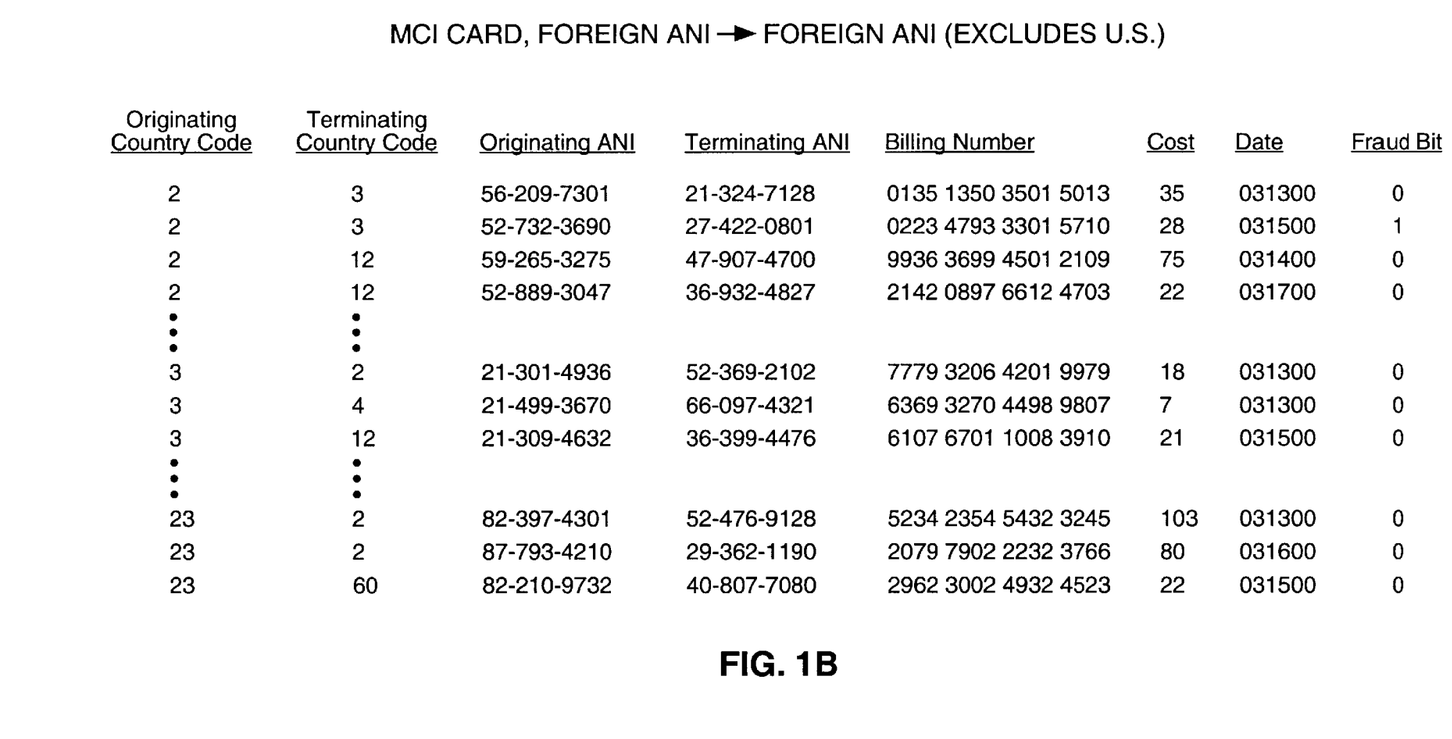
FIG. 1b is an excerpt of a representation of a third set of stored calling records according to the present invention.

Calling records for other first level streams of revenue may be organized in the same manner. Another first level stream of revenue may be, for example, calls made between two foreign countries (i.e., excluding the U.S.) using the MCI card during the week ending Mar. 18, 2000. FIG. 1b shows representative excerpts of calls for this first level stream of revenue. As seen, the calling records are analogous to those depicted in FIGS. 1 and 1a, except that there is a country code associated with both the originating ANI and the terminating ANI.

In FIG. 1b, the calling records are first grouped in ascending order according to the country code of the originating country (i.e., from where the call was placed). For each originating country, the calling records are next grouped by ascending order according to the country code of the terminating country (i.e., to where the call was placed). Finally, where there is more than one calling record for a terminating country, the calling records are organized in date order.

Thus, a number of second level streams of revenue may be identified from the calling records of FIG. 1b. The revenue generated by all calls originating from a select foreign country during the week is a second level stream of revenue. Likewise, the revenue generated by all calls terminating at a select foreign country is a second level stream of revenue.

Lower level streams of revenue may also be identified. For the second level stream of revenue corresponding to all calls originating from a select foreign country, a third level stream of revenue is the revenue generated by calls to another select foreign country. A fourth level stream of revenue is, for example, calls from a certain city (identified by a city code in the originating ANI) of the select foreign country made to the other select foreign country.

The first level streams of revenue shown in FIGS. 1, 1a and 1b capture most or all of the revenue source of international calls using the MCI card for the week ending Mar. 18, 2000. That is, FIGS. 1, 1a and 1b capture international calls from the U.S., international calls to the U.S., and international calls between foreign countries other than the U.S., respectively. However, because of the switching structure of certain international calls, certain other calling records may fall into additional compilations. For example, certain calls within North America are part of a "North American Dialing Plan" or "NADP" and are dialed using a ten digit ANI comprised of an area code and a seven digit number. For example, calls between the U.S. and Canada are included in the NADP and are dialed in the same manner as calls dialed within the United States. Calling records from the U.S. to Canada and vice versa thus do not fit neatly into the particular formats shown in FIGS. 1 and 1a, respectively. Consequently, calling records for NADP calls may be compiled separately, thus revenue generated by calls between NADP countries using the MCI card for the week ending Mar. 18, 2000 may comprise another first level stream of revenue for international calling using the MCI card. Lower level streams of revenue may also be generated from the NADP calling records, for example, calls from the U.S. to all other NADP countries may be a second level stream of revenue, calls from the U.S. to Canada may be a third level stream of revenue, calls from the U.S. to area code 204 in Canada may be a fourth level stream of revenue, etc.

Figure 2:
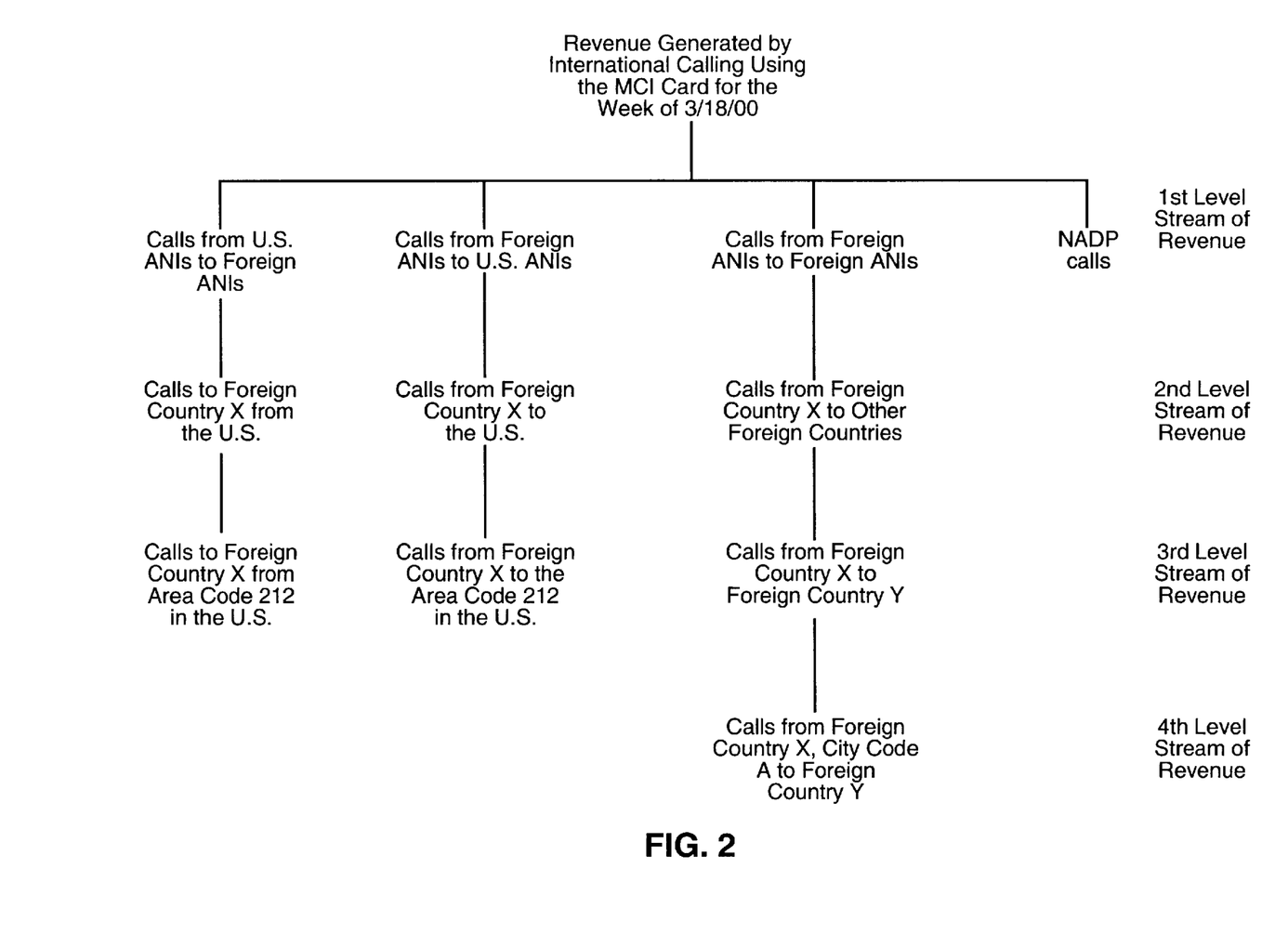
FIG. 2 shows a number of successive levels of streams of revenue for an exemplary revenue source.

A tree showing the examples of various level streams of revenue described above for FIGS. 1, 1a and 1b is shown in FIG. 2. As seen, the division of a revenue source into first and subsequent level streams of revenue need not be symmetric or corresponding. For example, the first level stream "calls from U.S. ANIs to foreign ANIs" includes calls from one country (the U.S.) to many foreign countries, whereas the first level stream "calls from foreign ANIs to foreign ANIs" includes calls from many foreign countries to many foreign countries. Despite that, the revenue for calls from the U.S. to foreign ANIs may be on par with revenue generated by calls between non-U.S. foreign ANIs.

The calling records shown in FIGS. 1, 1a and 1b and described above may be retrieved by a system, processed and formatted into a graphical display for a user. The user may select the revenue stream to be displayed, or may alternatively select a particular level stream of revenue for display. Based upon the selection, the system retrieves, processes and formats the pertinent data from the calling records into a graphical display of the selected revenue stream or stream of revenue for the user.

Figure 3:
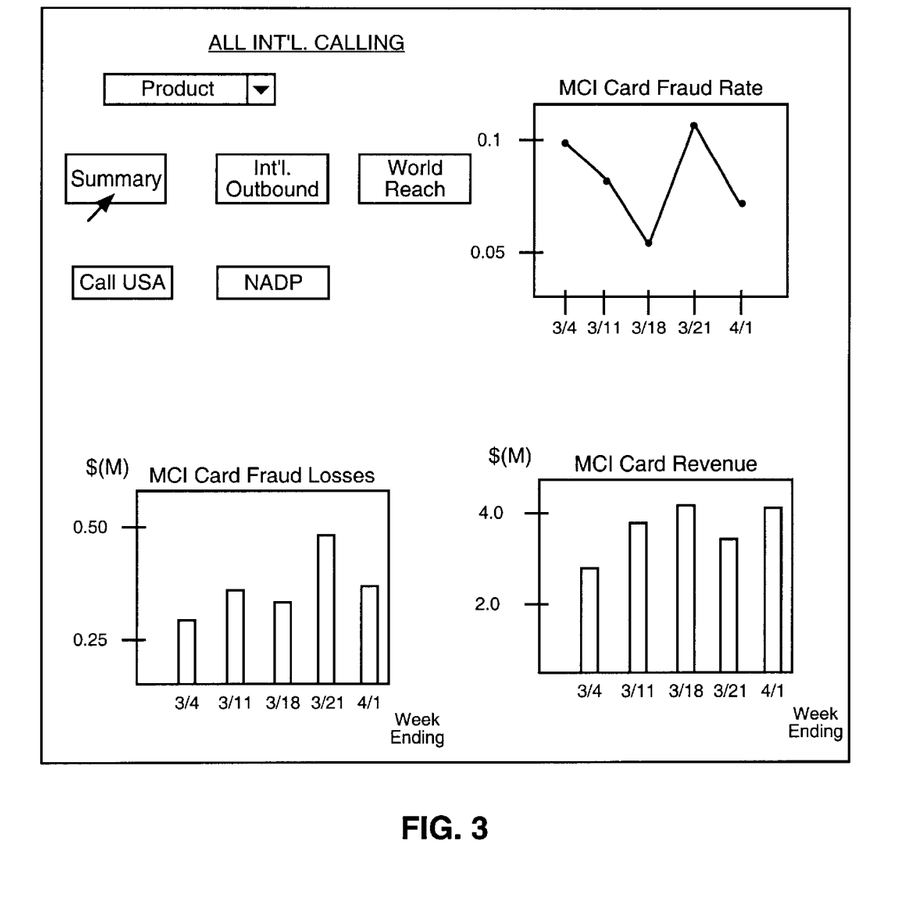
FIG. 3 is a representative display that is generated according to a preferred embodiment of the invention for a revenue source.

For example, FIG. 3 presents a exemplary display generated by the system and method of the present invention using calling records organized such as those described above. The graph presents a summary of revenue generated and losses due to fraud attributable to the revenue source focused on above, namely international calls using the MCI card. Data for five weeks is displayed in FIG. 3, including the week ending Mar. 18, 2000 of the records described above. While the week ending on Mar. 18, 2000 will thus be focused on in describing the display of FIG. 3, analogous records to those previously described are used to generate the other weeks surrounding March 18 depicted in FIG. 3 and subsequent figures.

The lower right graph of the display presents net revenue generated in millions of dollars by the MCI card for the week ending Mar. 18, 2000 (as well as the other four weeks). The revenue displayed for the MCI card in FIG. 3 may be generated by the system using the calling records of FIGS. 1, 1a and 1b (as well as those corresponding to NADP calls). As previously noted, these calling records are each first level streams of revenue and collectively represent the revenue source of international calling using the MCI card for the week of Mar. 18, 2000. Thus, by retrieving these calling records and summing all of the "cost" fields for legitimate calls (i.e., calling records having a fraud bit of zero), the total revenue is determined. The lower left graph presents the losses due to fraud attributable to international calling using the MCI card for week ending Mar. 18, 2000 (and the other four weeks) and is generated by adding records having fraud bit "1". The upper right hand graph presents losses due to fraud divided by revenue generated for each week of the five week period, thus charting the fraud rate for the MCI card over the five week period.

A processor, memory and related software comprise the system that generates displays such as the one depicted in FIG. 3. Calling records organized as shown in FIGS. 1, 1a and 1b and described above are received and stored for each week (along with NADP calling records). When the user selects input commands (described below) for the display shown in FIG. 1, processor retrieves the data from memory, adds the calling records of FIGS. 1, 1a, 1b and NADP calls having fraud bit "0" together, adds calling records having fraud bit "1" together, and formats the numeric data stored into the graphic data shown in the lower two graphs of FIG. 3, by applying normal software algorithms. In addition, the ratio of losses to revenue for each of the five weeks is calculated by the system and the results are formatted for the display shown in the upper right hand portion of FIG. 3.

A pull-down screen, labeled "Product" in FIG. 1, allows the user to choose the type of billing product for display. In the display of FIG. 1, the user has selected the MCI card, thus selecting for display calling records for international calls made using the MCI card. The user also selects the revenue source by clicking on "Summary". This generates the graphs shown in FIG. 3, which are the compilation of all fraud losses and revenue generated by the MCI card just described. Selection of the MCI card from the "Product" menu and clicking on "Summary" sends the required inputs to the processor to initiate the retrieval of data and the generation of the display shown in FIG. 1.

The system may receive and store calling records for international calls made using other billing products. Other billing products that may be included in the Product menu and selected therefrom include other types of calling cards, credit cards, pre-paid phone cards, etc. (Thus, revenue generated by international calls placed using these other billing products comprise additional "revenue sources" for the company.). If another billing product is selected from the "Product" menu and "Summary" is clicked, the system accesses analogous calling records for product selected and proceeds to generate graphs such as that depicted in FIG. 3 for international calls made using the selected billing product.

The user may also select a first level stream of revenue for display by providing another input to the system. For example, if the MCI card is selected from the Product menu and the "Int'l Outbound" box shown in FIG. 3 is clicked, the system displays calling records for international calls made from the U.S. to foreign countries for the five weeks, as showing in FIG. 4. To generate the data points for the week of Mar. 18, 2000 shown in FIG. 4, the system uses only the calling records shown in FIG. 1. Thus, the costs associated with calling records having fraud bit "0" are added, thereby generating the revenue generated by calls from the U.S. to foreign countries using the MCI card for the week of Mar. 18, 2000. This provides the data point for the week of Mar. 18, 2000 in the lower right graph. The costs associated with calling records having fraud bit "1" are added, thus generating fraud losses due to calls from the U.S. to foreign countries using the MCI card for the week of Mar. 18, 2000. This provides the data point for the week of Mar. 18, 2000 in the lower left graph. The fraud rate in the upper right graph is the ratio of fraud loss to revenue.

Figure 4:
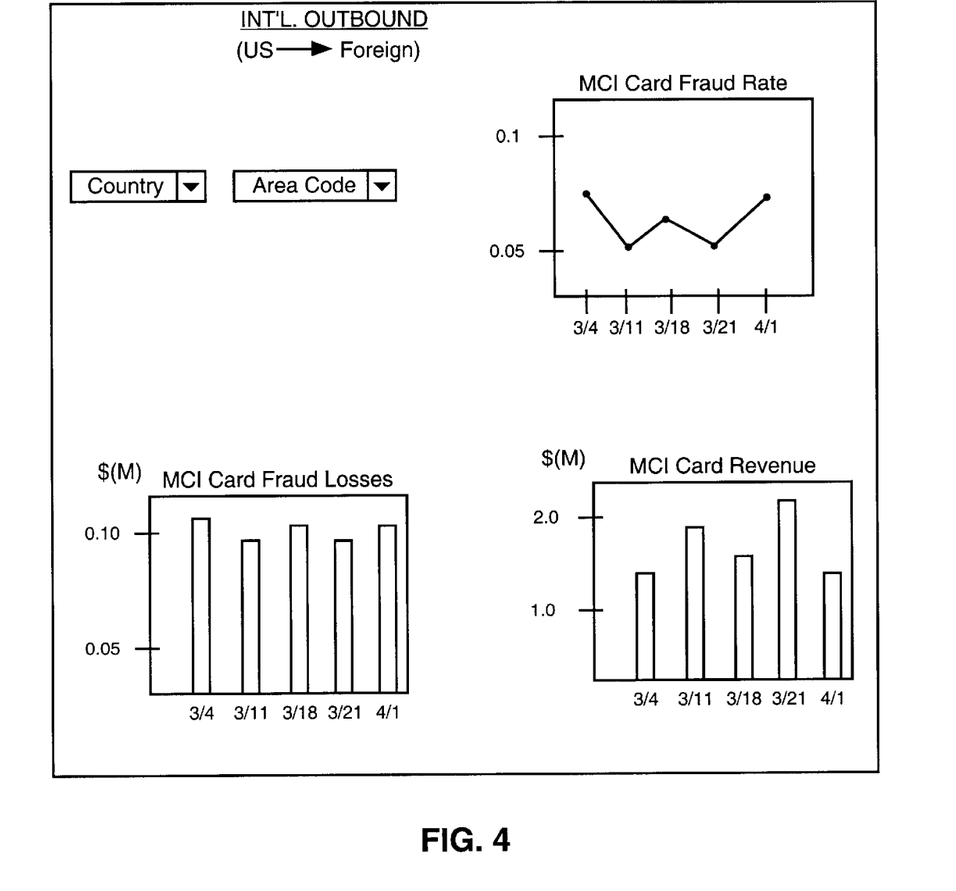
FIG. 4 is a representative display of a first level stream of revenue generated according to the preferred embodiment of the invention for the revenue source of FIG. 3.

The other four weeks displayed in the graphs of FIG. 4 are generated by the system accessing the analogous records for those weeks. Graphs such as those shown in FIG. 4 may be generated for other first level streams of revenue, such as calls from foreign countries to the U.S., calls between foreign countries, or NADP calls. These graphs may be generated by clicking on "Call USA", "World Reach" or "NADP" shown in FIG. 3. If Call USA is clicked (thus selecting calls from foreign countries to the U.S.), the calling records shown in FIG. 1a are utilized by the system to generate the graphs. If World Reach is clicked (thus selecting calls between foreign countries), the calling records shown in FIG. 1b are used. If a billing product other than the MCI card is selected from the Product menu, analogous records are accessed by the system to generate corresponding graphs if "Call USA", "World Reach" or "NADP" is clicked in FIG. 3.

Figure 5:
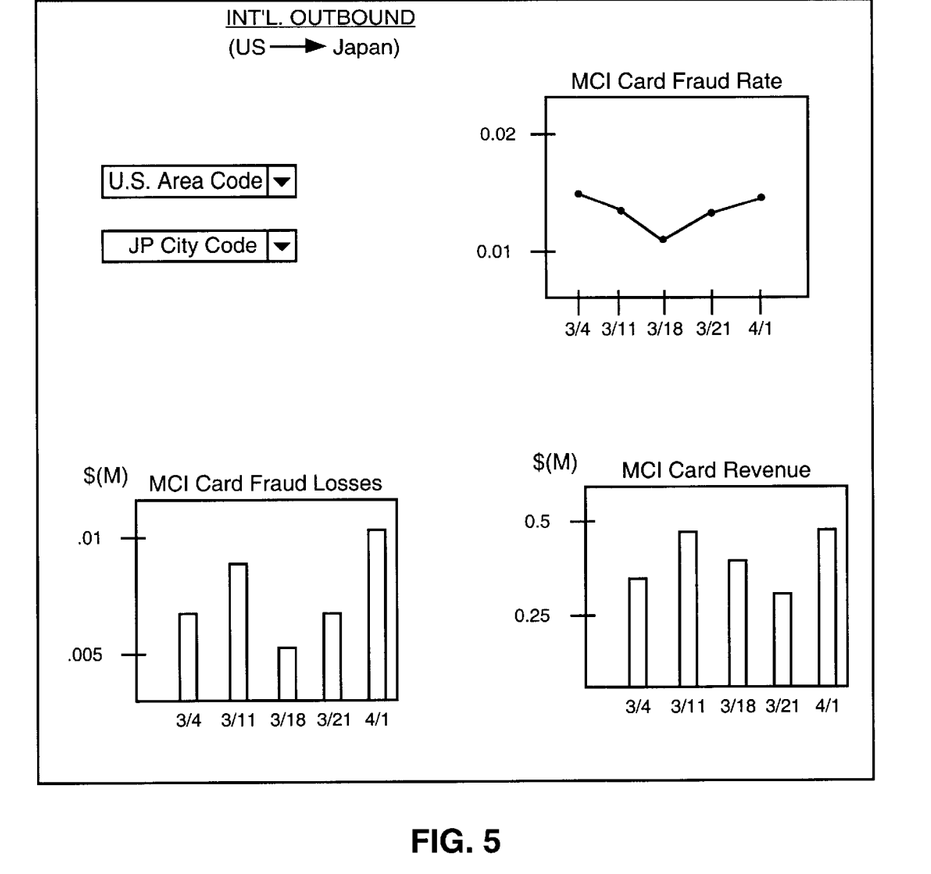
FIG. 5 is a representative display of a second level stream of revenue generated according to the preferred embodiment of the invention for the revenue source of FIG. 3.

Returning to FIG. 4, which graphically displays data for all calls from the U.S. to foreign ANIs, by selecting a particular country from the pull-down menu "Country", the system generates and displays graphs for losses and revenue for calls from the U.S. to the selected foreign country. FIG. 5 shows the graphs generated by the system where the user has selected Japan as the foreign country. To generate the graphs of FIG. 5 for the data point of the week ending Mar. 18, 2000, the system uses only those records in FIG. 1 having country code 81 (i.e., Japan's country code) in generating the revenue generated and fraud losses. The same is done for analogous calling records for the other four weeks, thus providing the graphs of FIG. 5. The graphs of FIG. 5 are thus a second level stream of revenue for the revenue source.

Figure 6:
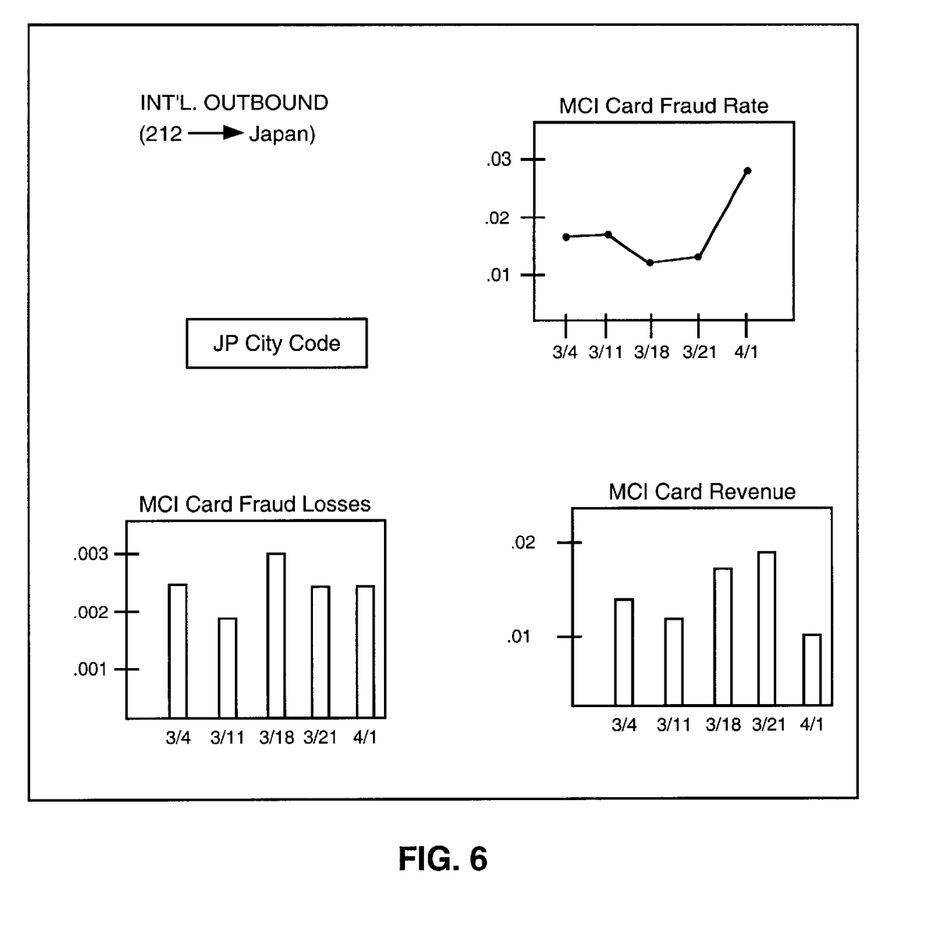
FIG. 6 is a representative display of a third level stream of revenue generated according to the preferred embodiment of the invention for the revenue source of FIG. 3.

FIG. 5 also has two pull-down menus generated by the system software, one entitled "U.S. Area Code" and another entitled "JP City Code". By selecting a particular area code from the U.S. Area Code menu, the system generates and displays graphs for losses and revenue for calls from the selected area code in the U.S. to Japan for the week. FIG. 6 shows the graphs generated by the system where the user has selected area code 212. To generate the revenue generated and fraud loss graphs of FIG. 6 for the data point of the week ending Mar. 18, 2000, the system uses only those records in FIG. 1 having Japan's country code 81 and 212 in the first three digits of the Originating ANI field. The same is done for analogous calling records for the other four weeks, thus providing the data points for the other weeks in the graphs of FIG. 6.

The graphs of FIG. 6 are a third level stream of revenue for the revenue source. As seen in FIG. 6, the "JP City Code" menu is again generated by the system of software, thus giving the user the ability to select a Japanese city that the calls are directed to from area code 212. They system generates loss and revenue graphs using the calling records used to generate FIG. 6, but further selecting those having the selected city code in the terminating ANI. Such a display (not shown) is a fourth level stream of revenue.

Referring back to FIG. 5, instead of selecting a U.S. area code from the first pull-down menu, the user may select a Japanese city from the JP City Code menu. If the user selects this alternative option, the system generates graphs for calls from the U.S. that are directed at the selected city. The system generates graphs by searching calling records such as those in FIG. 1 having country code 81 and selecting those having the selected city code in the terminating ANI field. Graphs depicting all calls from the U.S. to a select city in Japan is an alternative third level stream of revenue. If calls from a particular area code in the U.S. is subsequently selected, then a fourth level stream of revenue is again generated, as described above.

Similarly, in FIG. 4, a particular U.S. area code may be selected (instead of a particular foreign country) and the system generates graphs for calls from the selected area code to all foreign countries. The system selects from the calling records of FIG. 1 (and like calling records for other weeks) those calls having the area code in the originating ANI to generate the graphs. Such graphs depict a second level stream of revenue. If a particular country is then selected, graphs for a third level stream of revenue (area code to a foreign country) analogous to that shown in FIG. 6 are again generated.

In general, the invention comprises a method and system for organizing calling records so that data for one or more revenue streams may be selected and manipulated and for displaying graphic data for the revenue source in a manner that is useful to the user. The method and system also allows the user to select one or more streams of revenue of a particular level corresponding to the revenue source and the data is further manipulated and graphic representations for the selected stream of revenue are displayed to the user. Thus, the invention has a broad scope which includes the preferred embodiment described above and for the revenue stream and streams of revenue exemplified above, but is not limited to that embodiment and examples.

Figure 7:
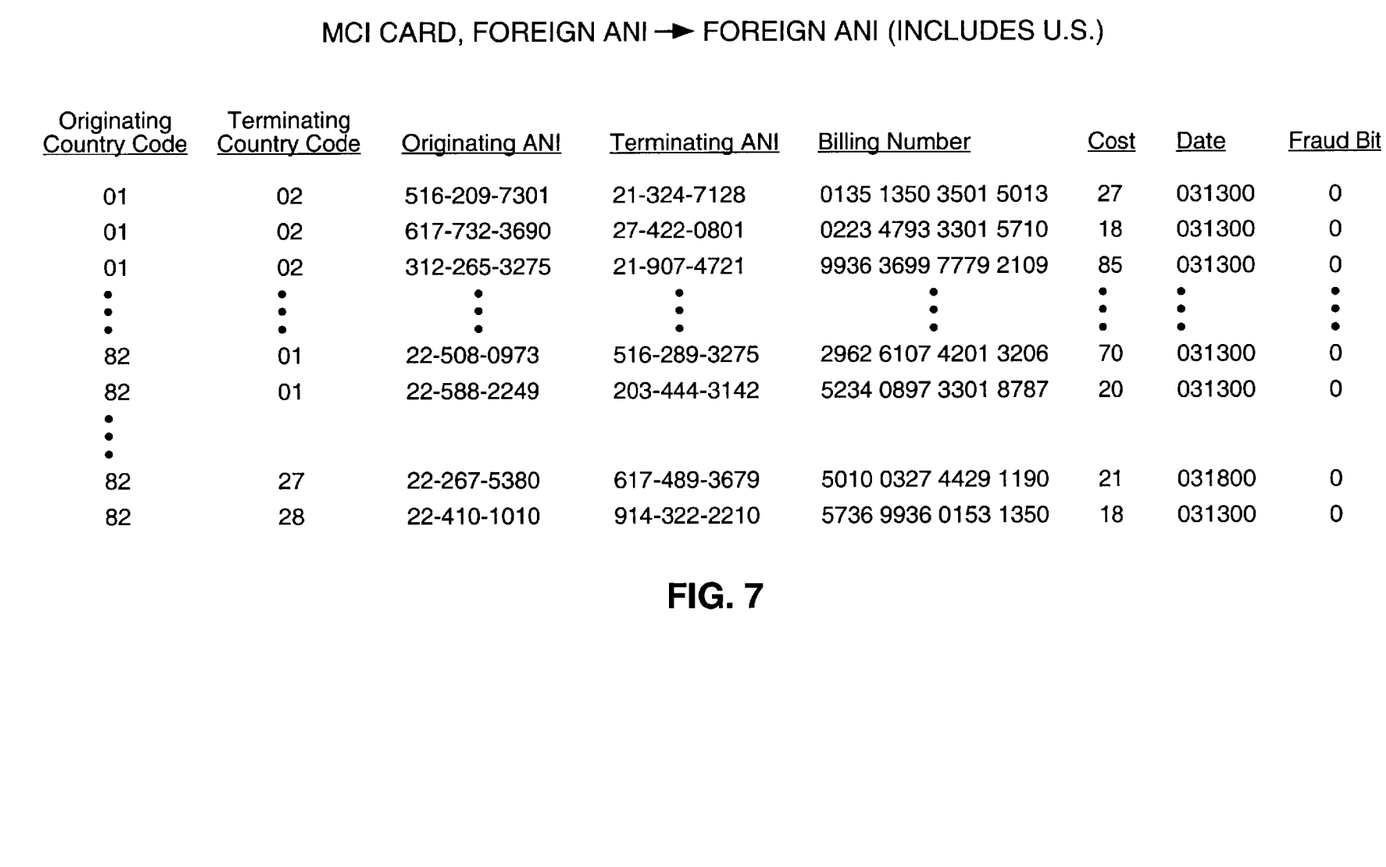
FIG. 7 is an excerpt of a representation of a fourth set of stored calling records according to the present invention.

For example, the calling data shown in FIGS. 1, 1a and 1b that are used in generating the graphs shown in FIGS. 2–6 may be organized in alternative manners. The calling records shown in these three separate figures may be compiled into one unified data structure. For example, the calling records shown in FIGS. 1 and 1a (calls from the U.S. to foreign countries and vice versa) may be integrated into a data structure such as that shown in FIG. 1b. In that case, calls from the U.S. to foreign countries are found where the "originating country code" is 01, which is the country code for the U.S. Similarly, calls from a particular foreign country to the U.S. are found under the "originating country code" for that foreign country and the "terminating country code" for the U.S. (that is, 01). An example of calling records integrated in this manner is shown in FIG. 7, where the first excerpt shown corresponds to calls from the U.S. (originating country code 01). The second and third excerpts correspond to calls originating in Korea (country code 82) to a number of foreign countries, including the U.S. (terminating country code 01).

It is noted that the U.S. and Canada both have country code "01". Thus, in an integrated record system such as that described above, the country code assigned to Canada may be "01a" in order to distinguish ANIs in the U.S. and Canada. Although not shown, calls made via the NADP may also be integrated into the record structure of FIG. 7. Thus, calling records between the U.S. and Canada, distinguished in the manner just described, would be found under originating country code and terminating country code "01" and "01a" in FIG. 7.

With the data for international calling using the MCI card compiled in such a manner, the graph shown for the revenue source of international calls made using the MCI card in FIG. 3 may be generated by compiling the cost and fraud data for the calling records in the one data structure. To generate graphs for streams of revenue at the various levels, such as the ones shown in FIGS. 4–6 and described above, the pertinent calling records are selected by the system using the relevant data fields. For example, to generate the graphs shown in FIG. 4, pertaining to calls from the U.S. to foreign countries, the system uses those calling records having originating country code 01 (i.e., the United States). To then generate the graphs shown in FIG. 5, pertaining to calls from the U.S. to Japan, the system uses those calling records having originating country code 01 and terminating country code 81 (i.e., Japan). Finally, to then generate the graphs shown in FIG. 6, pertaining to calls from area code 212 to Japan, the system uses those calling records having originating country code 01, terminating country code 81 and area code of the originating ANI field having 212.

As noted, the system also displays like graphs for other types of billing products selected by the user. The calling records for other billing products may be compiled, for example, in the manners described above. Alternatively, calling records for more than one billing product may be integrated together. In that case, the calling records may include an entry or entries that identify the billing product used for the call. When a billing product is selected by a user, the system further selects those calling records having an identifier corresponding to the selected billing product to generate the graphs for the revenue source or stream of revenue.

In addition, the calling records compiled as shown in FIGS. 1, 1a and 1b and described above were for the calls made using the MCI card for the week ending Mar. 18, 2000. As noted, in generating the graphs shown in FIGS. 3–6, like compilations of calling records are used to generate the charts and data points for the surrounding weeks displayed. Alternatively, a number of weeks may be included in the compilations in the manner shown in FIGS. 1, 1a and 1b (or in a calling record structure that integrates all international calling records for the MCI card, as described above). The system further selects and processes the calling records falling into each week in order to generate the graphs for the particular weeks ending as shown in FIGS. 4–6.

Also, although "revenue source" and corresponding "streams of revenue" of various levels are referred to above, what corresponds to a revenue source is not fixed. For example, the revenue source described above was revenue from international calls made using the MCI card. However, the revenue source may also be a higher level, such as revenue from international calls using all billing products. In that case, at the highest level, the system uses calling records for all billing products to generate graphs analogous to those shown in FIG. 3 for all billing products. Selection of a particular billing product by the user, such as the MCI card, is then a first level stream of revenue.

Likewise, for example, the system may be configured so that the revenue source is at a more detailed level, such as all international calls from the U.S. using the MCI card shown in FIG. 4. In the description above, international calls from the U.S. using the MCI card was a first level stream of revenue for the revenue source of international calls made using the MCI card.

Figure 8:
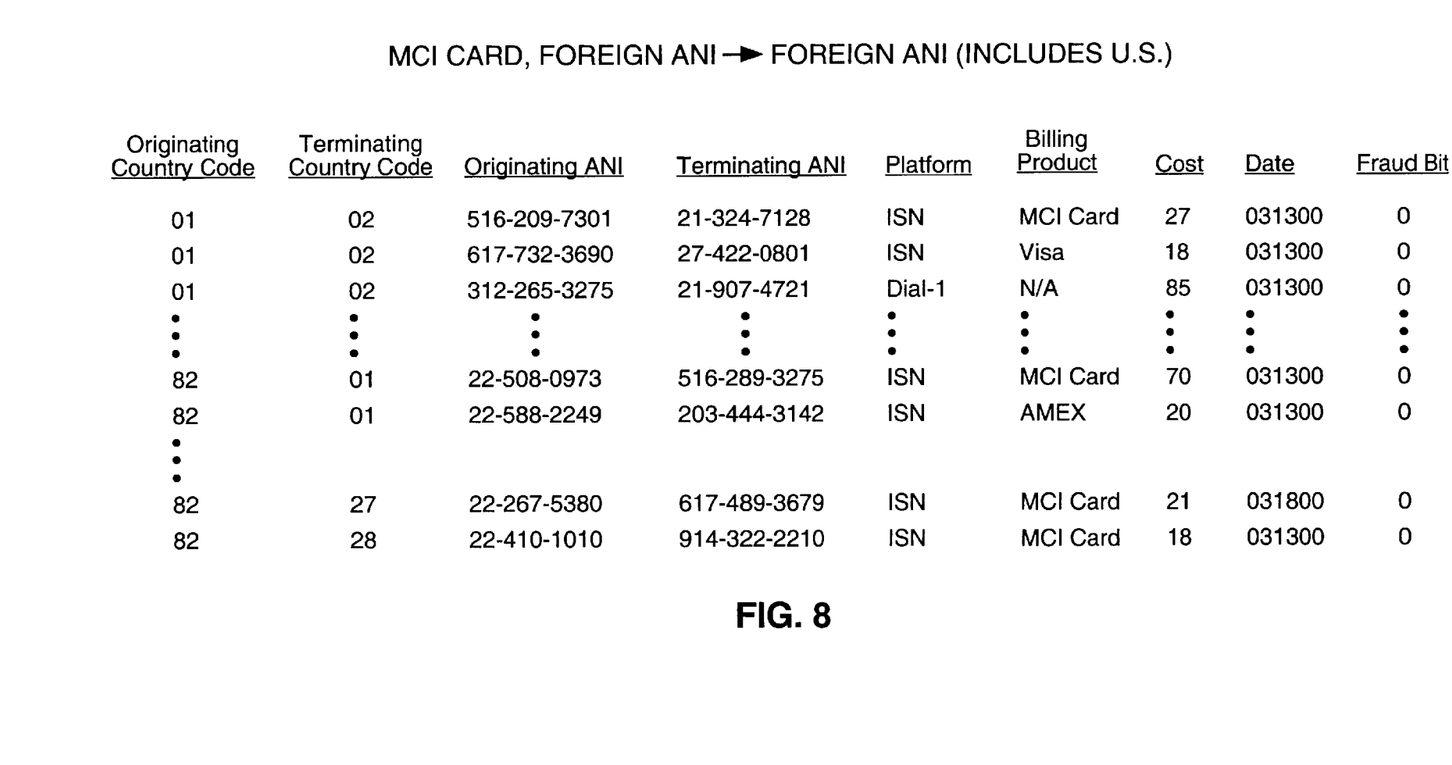
FIG. 8 is an excerpt of a representation of a fifth set of stored calling records according to the present invention.

Calling records may also (or alternatively) be compiled in a manner that enables the user to select from among more than one revenue source and those calling records may be further selected and processed by the system to generate graphs that display the revenue source selected and streams of revenue corresponding to the selected revenue source. FIG. 8 is a more comprehensive compilation of calling records that allows the user to select different revenue sources and then to "drill down" into streams of revenue of various levels for those sources. In FIG. 8, calling records are compiled for all international calls for a telecommunications company such as MCI that are made via the various switches or platforms made available by the company. The switches over which international calls may be placed may include the ISN (intelligent signaling network) platform, an air to ground platform and the "dial-1" platform. The ISN platform services those calls made using a billing product (such as the MCI card) and are routed by an automated response unit or an operator. Thus, calls made using the MCI card and other billing products described above with respect to FIGS. 1–7 are placed over the ISN platform. As another example, international calls made from residences and businesses having MCI as their long distance provider are made via the "dial-1" platform.

Referring to FIG. 8, there is no "billing number" field for the calling records; instead, there are "Platform" and "Billing Product" fields. The "Platform" field identifies which of the various platforms the call was made over, such as ISN, Dial-1, etc. The Billing Product field identifies which billing product, if any, was used to place the call. Some platforms, such as the Dial-1 platform which provides residential or commercial service, do not require a portable billing product. For these calls, the Billing Product field is filled with a "Not Applicable" or "N/A" entry. (The actual entries in the Platform and Billing Product fields of the calling, of course, would be a numeric or digital entry correlated to the various platforms and billing products.)

For a system having underlying calling records such as those given in FIG. 8, the system may allow the user to focus on revenue sources that are billing product based or switch based. Thus, the user may be given an initial choice of "Billing Product" or "Switch". When Billing Product is chosen, the system allows the user to select a particular billing product, and then generates graphs such as the one shown in FIG. 3 for the billing product. In order to generate the graphs, they system first identifies the calling records having the selected billing product in the Billing Product field. Those records are used by the system in the manner described above to generate the graphs of FIG. 3, and further allow the user to "drill down" into the details in the manner described above with respect to FIGS. 4–6.

If, however, the user selects "Switches", then the system allows the user to select a particular switch. For a particular switch selected, such as the "ISN" switch, the system selects those calling records having ISN in the platform field, and generates graphs showing fraud losses, revenue and fraud/revenue ratios for the ISN platform. The system may then allow the user to drill down into streams of revenue at various levels for the ISN platform, such as calls from a particular country, calls from a particular country to another country, etc. The system focuses on those pertinent calling records for the chosen switch in a manner similar to that described above for FIGS. 3–6 to drill down into the switch details.

Alternatively, when the user selects "Switches", the system may analyze the calling records and present the top five switches to the user in order of revenue generator, fraud losses, etc. The user may then select the switch from the list.

For a system having underlying calling records such as those given in FIG. 8, the system may also allow the user to focus on revenue sources in addition to those that are billing product or switch based. For example, the system may give the user a third initial option, "Country". When the user selects this initial option, the calling records of FIG. 8 may be used by the system, for example, to determine the five countries having the highest revenue for outgoing international calls for the period covered by the calling records. To do so, the system calculates the revenue for calls for each country as identified in the originating country code field of the calling records of FIG. 8. The system may present icons corresponding to the five countries and, if one is selected by the user, the revenue generated, fraud losses and fraud to revenue rate is displayed for that country.

Subsequent menus and icons allow the user to drill down further into the records for streams of revenue of various levels for that country. For example, a "Product" pull down menu may allow the user to focus on revenue and fraud losses for a billing product (such as the MCI card) used to make calls from the selected country. Alternatively, a "Week Ending" pull down menu may allow the user to focus on revenue and fraud losses for a particular week from the selected country. For either case, a stream of revenue of a subsequent level may be, for example, revenue and losses for calls from a particular country using a particular billing product during a particular week.

Thus, while this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. A system for analyzing fraud in a telecommunications system, the system comprising at least one processor, software and calling records stored in a database, the at least one processor receiving input data corresponding to user selection of one of a plurality of revenue sources and one or more streams of revenue of a plurality of levels of streams of revenue that contribute to the selected revenue source, the system retrieving and processing the calling records pertaining to the selected revenue source and the selected one or more streams of revenue and generating at least one graphical display pertaining to the revenue generated and losses due to fraud for the selected revenue source and the selected one or more streams of revenue.

2. The system as in claim 1, wherein the system also generates one or more input selections for a user following user selection of a revenue source, the one or more input selections pertaining to one or more first level streams of revenue for the revenue source, wherein each first level stream of revenue contributes a distinctly defined portion of revenue to the selected revenue source.

3. The system as in claim 2, wherein the system processes an input selected by the user of a first level stream of revenue by identifying those calling records in the database that contribute to the first level stream of revenue selected, processing the identified calling records and generating at least one graphical display pertaining to the revenue generated and losses due to fraud for the selected first level stream of revenue.

4. The system as in claim 2, wherein the system also generates one or more input selections for a user following user selection of a first level stream of revenue, the one or more input selections pertaining to one or more second level streams of revenue, each second level stream of revenue contributing a distinctly defined portion of revenue to the selected first level stream of revenue.

5. The system as in claim 4, wherein the system processes an input selected by the user of a second level stream of revenue by identifying those calling records in the database that contribute to the second level stream of revenue, processing the identified calling records and generating at least one graphical display pertaining to the revenue generated and losses due to fraud for the selected second level stream of revenue.

6. The system as in claim 2, wherein the system also generates one or more input selections for a user following user selection of an nth level stream of revenue, where n is an integer 1 or greater, the one or more input selections pertaining to one or more (n+1)th level streams of revenue, each (n+1)th stream of revenue contributing a distinctly defined portion of revenue to the selected nth level stream of revenue.

7. The system as in claim 6, wherein the system processes an input selected by the user of an (n+1)th level stream of revenue by identifying those calling records in the database that contribute to the (n+1)th level stream of revenue, processing the identified calling records and generating at least one graphical display pertaining to the revenue generated and losses due to fraud for the selected (n+1)th level stream of revenue.

8. The system as in claim 1, wherein the revenue source is delimited by revenue generated by international calls made via a telecommunications company.

9. The system as in claim 8, wherein the streams of revenue of subsequent levels are delimited by at least one of a selected billing product, telecommunications switch, period of time and country.

10. The system as in claim 1, wherein the system generates graphs of the revenue generated, the losses due to fraud and the fraud to revenue ratio for the selected revenue source and the selected one or more streams of revenue.

11. The system as in claim 1, wherein calling records stored in the database include a field identifying the country from which a call is placed, a country to which a call is placed, a cost associated with the call and whether the call was fraudulently placed.

12. A method for analyzing fraud in a telecommunications system comprising:
   a) presenting a user with graphic data pertaining to fraud and revenue for one of a plurality of revenue sources;
   b) presenting the user with a selection of one or more streams of revenue of an nth level that contribute to the revenue source, where n is greater than or equal to one;
   c) receiving a selection from the user for one of the one or more nth level streams of revenue; and
   d) generating graphic data pertaining to fraud and revenue for the selected nth level stream of revenue,
      wherein each first (n=1) level stream of revenue contributes a distinctly defined portion of revenue to the revenue source and each nth level stream of revenue where n≧2 contributes a distinctly defined portion of revenue to an (n−1)th level stream of revenue.

13. The method as in claim 12, further comprising reviewing a set of calling records, identifying calling records having revenue contributing to the revenue source and processing the identified calling records in order to generate the graphic data of step a) pertaining to fraud and revenue for the revenue source presented to the user.

14. The method as in claim 12, further comprising, interposed between step c) and step d), reviewing a set of calling records, identifying calling records having revenue contributing to the nth level stream of revenue selected in step c) and processing the identified calling records in order to generate the graphic data of step d) pertaining to fraud and revenue for the stream of revenue selected.

15. The method as in claim 12, further comprising presenting to the user the graphic data pertaining to fraud and revenue for the selected nth stream of revenue generated in step d).

16. The method as in claim 12, further comprising:
   i) presenting the user with a selection of one or more revenue sources; and
   ii) receiving a selection from the user for one of the one or more revenue sources,
the steps i) and ii) occurring before step a).

17. The method as in claim 16, further comprising, interposed between step ii) and step a), reviewing a set of calling records, identifying calling records having revenue contributing to the revenue source selected and processing the identified calling records in order to generate the graphic data of step a) pertaining to fraud and revenue for the revenue source presented to the user.

18. The method as in claim 12, wherein n=1, the user is presented with a selection of one or more streams of revenue of a first level that contribute to the revenue source in step b), a selection is received from the user for one of the one or more first level streams of revenue in step c) and graphic data is generated pertaining to fraud and revenue for the selected first level stream of revenue in step d), the method further comprising:

e) presenting the user with a selection of one or more second level streams of revenue;

f) receiving a selection from the user for one of the one or more second level streams of revenue; and g) generating graphic data pertaining to fraud and revenue for the selected second level stream of revenue.

19. The method as in claim 12, further comprising:

e) repeating steps b), c) and d) for at least one iteration of n=n+1.

20. The method as in claim 19, further comprising, interposed between each repetition of step c) and step d), reviewing a set of calling records, identifying calling records having revenue contributing to the stream of revenue of the nth level selected in step c) and processing the identified calling records in order to generate the graphic data of step d) pertaining to fraud and revenue for the selected nth level stream of revenue.

* * * * *